United States Patent [19]
Laakso et al.

[11] Patent Number: 5,715,279
[45] Date of Patent: Feb. 3, 1998

[54] METHOD FOR ESTIMATING A CHANNEL, AND A RECEIVER

[75] Inventors: Timo Laakso, Helsinki; Jorma Lilleberg, Oulu, both of Finland

[73] Assignees: Nokia Telecommunications Oy, Espoo; Nokia Mobile Phones Ltd., Salo, both of Finland

[21] Appl. No.: 526,462

[22] Filed: Sep. 11, 1995

[30] Foreign Application Priority Data

Sep. 12, 1994 [FI] Finland .................. 944203

[51] Int. Cl.⁶ .................. H04B 3/46
[52] U.S. Cl. .................. 375/224
[58] Field of Search .................. 375/224, 200, 375/254, 260, 267, 346, 347; 455/278.1, 284, 296, 303, 305, 59, 63, 65, 67.3, 52.3

[56] References Cited

U.S. PATENT DOCUMENTS

| | | | |
|---|---|---|---|
| 3,855,423 | 12/1974 | Brendzel et al. | 179/15.55 |
| 4,457,007 | 6/1984 | Gutleber | 375/349 |
| 5,218,619 | 6/1993 | Dent | 370/209 |
| 5,325,394 | 6/1994 | Bruckert | 375/200 |

FOREIGN PATENT DOCUMENTS

| | | |
|---|---|---|
| 0491668 A2 | 6/1992 | European Pat. Off. . |
| 0526439 A1 | 2/1993 | European Pat. Off. . |
| WO 91/07035 | 5/1991 | WIPO . |

OTHER PUBLICATIONS

Chapter 12.6: Sequential LMMSE Estimation, Steven M. Kay: "Fundamentals of Statistical Signal Processing: Estimation Theory", Prentice-Hall, 93.
Finnish Patent Application No. 944202 and English Translation thereof.
Finnish Office Action and English Translation thereof, dated Jun. 30, 1995, Nokia Telecommunications Oy, Application No. 944203.

*Primary Examiner*—Stephen Chin
*Assistant Examiner*—Kevin Kim
*Attorney, Agent, or Firm*—Perman & Green, LLP

[57] ABSTRACT

The invention relates to a method for estimating a channel in a receiver of a cellular radio system, and a receiver receiving a signal which contains transmission of one or more users and comprising means (20) for filtering the received signal with a filter matched with the waveform of the signal, and means (20) for estimating the delays and amplitudes of the strongest received signal components from the filtered signal. In order to estimate a channel with a high accuracy, the receiver according to the invention comprises means (23) for estimating and extracting always the next strongest signal component from the signal, until all components have been estimated, and means (24, 25) for extracting from the received signal the signals interfering the most with the strongest signal component of each user, and means (24, 25) for estimating again the strongest signal component, and means (24, 25) for estimating and extracting from the signal always the next strongest signal component, until all components have been estimated.

18 Claims, 1 Drawing Sheet

METHOD FOR ESTIMATING A CHANNEL, AND A RECEIVER

FIELD OF THE INVENTION

The invention relates to a method for estimating a channel in a receiver of a cellular radio system, a signal received in the receiver comprising transmissions of one or more users and being filtered with a filter matched with the waveform of the signal, estimates of the delays and amplitude of the strongest received signal components being obtained from the filtered signal.

BACKGROUND OF THE INVENTION

In a typical cellular radio network, a signal propagates from a transmitter to a receiver via several paths. This multipath propagation is due to the reflection of the signal from the surfaces surrounding the radio path, such as from buildings. There is often no direct visual communication between the transmitter and the receiver, whereupon the receiver receives no single strong signal which would have propagated directly, but several reflected signal components, which have almost the same power, which have propagated via different paths, and which have slightly different phases due to propagation paths of different lengths.

The present invention is applicable in any cellular radio system which requires the estimation of a channel impulse response, but it can be applied especially advantageously in CDMA systems.

CDMA is a multiple access method based on a spread spectrum technique, and it has been recently put into use in cellular radio systems in addition to previously used FDMA and TDMA. CDMA has many advantages over the prior methods, such as simplicity of frequency planning, and spectrum efficiency.

In a CDMA method, a narrow-band data signal of a user is multiplied to a relatively broad band by a spreading code having a much broader band than the data signal. Band widths used in known test systems include e.g. 1.25 MHz, 10 MHz and 25 MHz. The multiplication spreads the data signal over the entire band to be used. All the users transmit simultaneously on the same frequency band. A different spreading code is used on each connection between a base station and a mobile station, and the signals of the users can be distinguished from one another in the receivers on the basis of the spreading code of the user. If possible, the spreading codes are selected in such a way that they are mutually orthogonal, i.e. they do not correlate with one another.

Correlators in conventionally implemented CDMA receivers are synchronized with a desired signal, which they recognize on the basis of the spreading code. In the receiver the data signal is restored to the original band by multiplying it by the same spreading code as in the transmission step. Ideally, the signals that have been multiplied by some other spreading code do not correlate and are not restored to the narrow band. In view of the desired signal, they thus appear as noise. The object is to detect the signal of the desired user from among a number of interfering signals. In practice, the spreading codes correlate, and the signals of the other users make it more difficult to detect the desired signal by distorting the received signal. This interference caused by the users to one another is called multiple access interference.

In a CDMA multiple access method, all users transmit within the same frequency range. The received signal comprises both the desired signal and the signals of other users, interfering with the desired signal. In a typical cellular radio network, several multipath-propagated signal components of both the desired transmission and the interfering transmissions are received. Therefore it is important, especially in CDMA receivers, to estimate the amplitudes and delays of the transmissions contained in the received signal.

Normally the channel estimator used is a filter matched with either the symbol or channel identification waveform. The method works well when the delays of the transmissions contained in the signal are clearly different. The output signal of the matched filter is monitored and when the filter momentarily obtains a high value it is concluded that at that instant the waveform is completely inside the matched filter. The signals which have propagated via different paths arrive at the matched filter at different times, whereupon the filter always provides a peak value momentarily in its output. When the delays between the different paths are relatively close to one another, it is difficult to distinguish the maximum points corresponding to the different paths from one another, and even though the maximum points could be distinguished, their locations no longer accurately reveal the delays of the different paths. The error is due to the bias adjacent paths cause in each other's estimates.

In addition to the above-described method, a few more effective methods are also known for calculating the impulse response, but they are very demanding with respect to calculation and they are not generally applied in cellular radio systems.

SUMMARY OF THE INVENTION

The purpose of the present invention is to realize a method by means of which the delays and amplitudes of a channel can be accurately estimated, but which is not too demanding to implement with respect to calculation.

This is achieved with the method of the type described in the preamble, the method being characterized in that in the first iteration round, the strongest estimated signal component of each user is extracted from the received signal, and that the second strongest detected signal component of each user is estimated and extracted from the remaining signal, and that always the next strongest signal component is estimated and extracted from the signal, until all components have been estimated, and that in the second iteration round, the signals interfering the most with the strongest signal component of each user are extracted from the received signal, and the strongest signal component is then estimated again, and that always the next strongest signal component is then estimated and extracted from the signal, until all components have been estimated, and that a desired number of iteration rounds are performed.

The invention also relates to a receiver receiving a signal which contains transmissions from one or more users and comprising means for filtering the received signal with a filter matched with the waveform of the signal, and means for estimating the delays and amplitudes of the strongest received signal components from the filtered signal. The receiver according to the invention is characterized in that the receiver comprises means for extracting the strongest estimated signal component of each user from the received signal, and that the receiver comprises means for estimating and extracting said next strongest detected signal component of each user, and means for estimating and extracting from the signal always the next strongest signal component, until all components have been estimated, and that the receiver comprises means for extracting from the received signal the signals interfering the most with the strongest signal component of each user, and means for estimating again the strongest signal component, and means for estimating and extracting from the signal always the next strongest signal component, until all components have been estimated, and that the receiver comprises means for performing a necessary number of estimation rounds on the received signal.

The iterative calculation method according to the invention provides better accuracy that a matched filter. Strong signal components which have already been estimated are removed from the received signal, and the remaining components can then be estimated more accurately. The largest detected component is always removed iteratively, until all components have been estimated.

The method can be applied both in a subscriber terminal and in a base station. The task is easier in a terminal equipment, since the signals transmitted by the same base station propagate through the same channel, and therefore there is less to estimate.

BRIEF DESCRIPTION OF THE DRAWINGS

In the following, the invention will be described in greater detail with reference to the examples according to the accompanying drawings, in which.

DETAILED DESCRIPTION OF THE INVENTION

Figure 1:
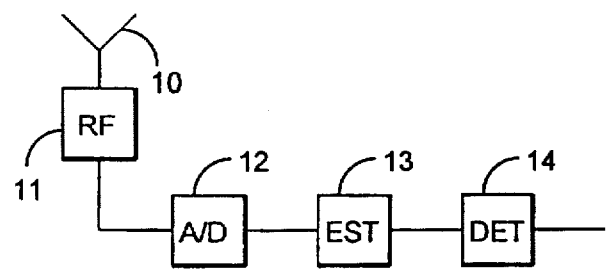
FIG. 1 is a block diagram representing the structure of a receiver according to the invention.

The problem is thus to estimate the delays $\{d_l, l=0,1, \ldots, L-1\}$ and amplitudes $\{a_l, l=0,1, \ldots, L-1\}$ of the channel model $$c(t) = \sum_{l=0}^{L-1} a_l \delta(t - d_l).$$

In the following, the method according to the invention is described first by utilizing as an example the reception of a signal of one user.

A signal received according to the method is filtered conventionally with a matched filter, thus supplying the delay and amplitude of the multipath-propagated signal component which has the most visible response, i.e. which provides with highest local maximum in the output of the matched filter. In the method according to the invention, the aforementioned largest signal component is extracted from the received signal. The next largest signal components is again estimated from the remaining signal and then extracted. In this way the signal components are estimated and extracted from the signal in the order of magnitude, until all components have been estimated.

According to the method, a second round of iteration is performed, and during this round the signal components interfering the most with the largest signal component are extracted from the original signal which passed through the matched filter. After this, the location and amplitude of the largest signal component is estimated again. This estimate is extricated from the received signal, after which the next largest signal component is estimated and extracted from the same signal. This operation is repeated for all signal components. This provides the signal components with good estimates, which contain no biases caused by the other components. If necessary, a third iteration round or more are performed, each round always providing more accurate estimates for the signal components. The iteration is continued for a predetermined number of times, or until the iteration no longer reduces the estimation error, which can be determined in the following manner $$E(a, D) = \sum_{i=0}^{N-1} \left| r(t_i) - \sum_{j=1}^{L} a_j s(t_i - d_j) \right|^2$$

where $t_i = t_0 + i\Delta$, where $\Delta$ is a sample period, $a = [a_1, a_2 \ldots, a_L]$ and $D = [d_1, d_2, \ldots, d_L]$. L is typically a relatively small number, for example 2 to 6. In practice the number of the iteration rounds can be selected beforehand for example as one, two or three, since the above equation requires a relatively large amount of calculation. It must be noted that even one iteration round improves the estimates as compared with the conventional manner of estimating delays and amplitudes.

Examine for example the channel model $$c(t) = a_1 \delta(t-d_1) + a_2 \delta(t-d_2) + a_3 \delta(t-d_3),$$

which concerns a three-path channel where a transmitted signal propagates along paths $a_1$, $a_2$ and $a_3$. When a signal $s(t)$ is transmitted through the channel, the receiver receives a signal $r(s)$, which in this case has the form $$r(t) = a_1 s(t-d_1) + a_2 s(t-d_2) + a_3 s(t-d_3) + n(t),$$

where $n(t)$ is white Gaussian noise. In the method according to the invention, a receiver signal is first supplied through a matched filter. The output of a filter $h_{MF}(t) = s(T-t)$, where T is the length of the waveform $s(t)$, matched with the waveform $s(t)$ provides a signal $y(t)$, which has the form $$y(t) = a_1 v(t-d_1) + a_2 v(t-d_2) + a_3 v(t-d_3) + z(t),$$

where $v(t) = \int_R s(T+x-t) s(x) dx$ and $z(t) = \int_R s(T+x-t) n(x) dx.$

Assume that $|a_1| \geq |a_2| \geq |a_3|$, i.e. a transmission arriving via the path $a_1$ has the highest amplitude. In the method according to the invention, the first iteration round has the following steps in order:

1. Find $d_{1,1} = \text{argmax } \{|y(t)|\}$ which provides $\hat{a}_{1,1} = y(\hat{d}_{1,1})$
2. Calculate $y^{(1,1)}(t) = y(t) - \hat{a}_{1,1} v(t - \hat{d}_{1,1})$
3. Find $\hat{d}_{2,1} = \text{argmax}\{|y^{(1,1)}(t)|\}$, from which $\hat{a}_{2,1} = y^{(1,1)}(\hat{d}_{2,1})$
4. Calculate $y^{(2,1)} = y^{(1,1)} - \hat{a}_{2,1} v(t - \hat{d}_{2,1})$
5. Find $\hat{d}_{3,1} = \text{argmax } \{|y^{(2,1)}(t)|\}$, from which $\hat{a}_{3,1} = y^{(2,1)}(\hat{d}_{3,1})$ In phase 1, an estimate is first found for the largest detected signal component, which in phase 2 is extracted from the filtered signal. In phase 3, the second largest signal component is estimated, and in phase 4 it is extracted from the signal. In phase 5, the last signal component is found and estimated.

The second iteration round comprises the following phases:

1. Calculate $\tilde{y} = y(t) - \hat{a}_{2,1} v(t - \hat{d}_{2,1}) - \hat{a}_{3,1} v(t - \hat{d}$
2. Find $\hat{d}_{1,2} = \text{argmax } \{|\tilde{y}(t)|\}$, from which $\hat{a}_{1,2} = \tilde{y}(\hat{d}_{1,2})$
3. Calculate $y^{(1,2)}(t) = y(t) - \hat{a}_{1,2} v(t - \hat{d}_{1,2})$
4. Find $\hat{d}_{2,2} = \text{argmax}\{|y^{(1,2)}(t)|\}$, from which $\hat{a}_{2,2} = y^{(1,2)}(\hat{d}_{2,2})$
5. Calculate $y^{(2,2)} = y^{(1,2)} - \hat{a}_{2,2} v(t - \hat{d}_{2,2})$ 6. Find $\hat{d}_{3,2}=\text{argmax }\{|y^{(2,2)}(t)|\}$, from which $\hat{a}_{3,2}=y^{(2,2)}(\hat{d}_{3,2})$ In phase 1, the signals interfering with the strongest signal component are extracted from the filtered signal, and in phase 2 the strongest signal component is estimated again from the purged signal. The received more accurate estimate is extricated from the original filtered signal in phase 3. In phase 4, the next largest signal component is estimated, and in phase 5 it is extracted from the signal. In phase 6, the last signal component is found and estimated.

It is likely that the following iteration rounds do not substantially improve the accuracy of the estimator, if the waveforms are selected in such a way that their autocorrelation functions are similar to the impulse.

The method according to the invention is described above by way of example examining the mutual interference effects of the different paths of a transmission by one user only. However, a CDMA base station receives several users the signals of which also cause errors in the channel estimation. The procedure according to the invention can be implemented in a case of several users in such a way that the strongest multipath-propagated signal components of each user are estimated and extracted from the received total signal in the order of magnitude, and the next signal components are estimated from the data purged in this way.

The accuracy of the estimation is generally improved if the estimates are not based on one measurement, but the information obtained from successive measurements is utilized by aiming at combining the information of the separate measurements in order to minimize the estimation error. In the preferred embodiment of the present method, the estimates obtained with iteration are post-processed by filtering successive estimates in order to provide better channel parameters. Sequential LMMSE filtration may be used for this purpose, and it is described in Kay, Steven M., *Fundamentals of Statistical Signal Processing: Estimation Theory*, Prentice-Hall, 1993. It is also possible to apply nonlinear estimators, which are implemented with neural network methods.

The method according to the invention may also utilize fuzzy logic in making decision concerning the order of the signal extraction. For example, it is not always preferable to extract the strongest signal at all, if the other signal components are almost as strong, but are clearly situated apart from each other. In such a case it is possible to use as the preliminary delay estimates the delays and amplitudes which can be deduced directly from the location of the extreme value points of the signal supplied from the matched filter.

The properties of the autocorrelation function of the spreading codes used may also be utilized in the decision-making. If it is known for example that the detected extreme value points of the matched filter output signal are situated at such a distance from one another that they can be concluded, on the basis of the properties of the autocorrelation function, to affect each other only slightly, extraction is not necessary. Other heuristic rules of this type can also be drafted and utilized either during the iteration process or the post-processing of the obtained estimates.

The channel estimation method according to the invention can generally be utilized in association with any detection method. It is especially applicable in connection with such detection methods that require accurate information about the delays and amplitudes of the received signal components. A detection method of this kind to be applied with the channel estimator according to the invention is based on the fact that the received signal is sampled in the detector on a high sample frequency, typically 3 to 10 times the bit rate of the spreading code. The detection utilizes an adjustable monitoring period, which extends over several symbols and which enables reliable estimates. An estimate is calculated recursively for each desired transmission from the samples, and whenever a new sample arrives, the calculated estimates are updated on the basis of the new sample with a calculable correction coefficient. Using the correction coefficient substantially decreases the amount of calculation required. In order to detect the desired transmissions, the channel estimation method according to the invention is used. This detection method is described in greater detail in the co-pending Finnish Patent Application 944202, which is referred to here.

FIG. 1 is a block diagram illustrating the structure of a receiver according to the invention. The receiver according to the invention may be either a base station receiver or a receiver of a subscriber terminal. The receiver comprises an antenna 10 receiving signals which are supplied to radio-frequency parts 11, which convert the radio-frequency signal to an intermediate frequency. From the radio-frequency parts 11 the signal is supplied to an A/D converter 12, which converts the signal to a digital form. The digitalized signal is supplied to a channel estimator 13, where the delays and amplitudes of the transmissions contained in the received signal are estimated. The received signal is further supplied to a detector, which detects the desired signals. The detected symbols are then supplied to other parts of the receiver. The receiver also comprises other components, such as filters and amplifiers, but they are not essential to the invention.

Figure 2:
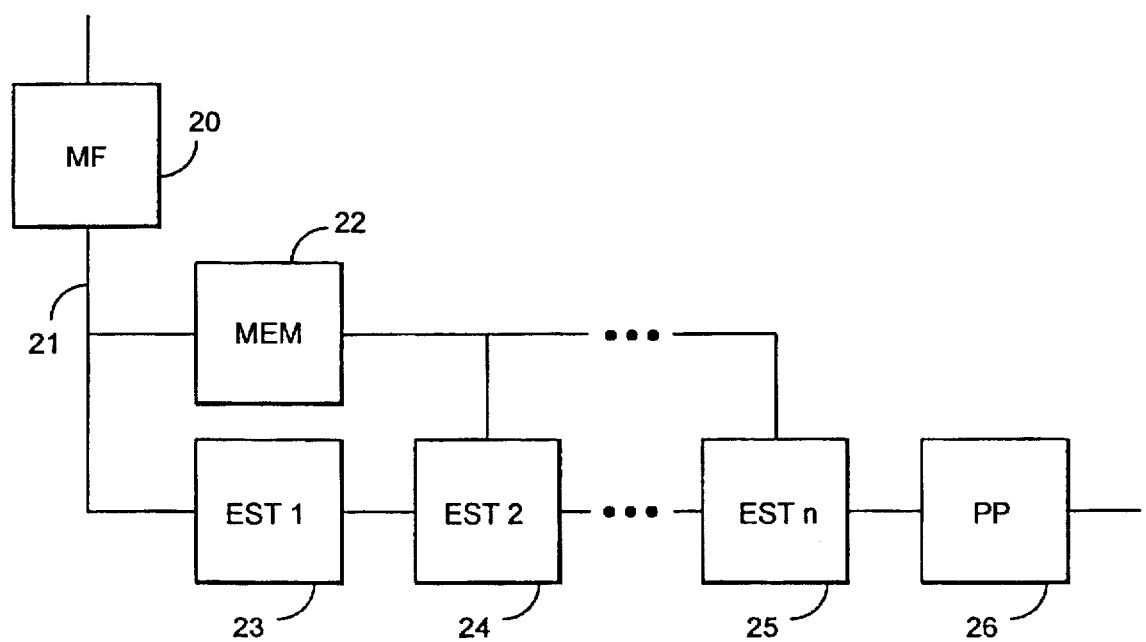
FIG. 2 illustrates in greater detail one possible implementation of a channel estimation block in a receiver according to the invention.

FIG. 2 illustrates in greater detail one possible implementation of a channel estimation block in a receiver according to the preferred embodiment of the invention. The channel estimation block comprises a filter 20 matched with the received signal and realized by means of known technology, the output signal 21 of the filter reaching its extreme value whenever the waveform of the received signal is completely within the matched filter. The output signal 21 of matched signal is supplied to a memory element 22, which stores the received signal during the estimation. The output signal 21 of the filter is also supplied to a first estimation means 23, which performs the first round of iteration by estimating and extracting the strongest signal component in the order of magnitude until all components have been estimated.

The estimation block further comprises estimation means 24, 25, where a desired number of following iteration rounds are performed in such a way that the estimation means 24, 25 first extract the components interfering with the largest signal component estimate from the received signal supplied by the memory means 22. The estimation means 24, 25 then estimate again the largest signal component and extract it from the signal. The estimation means then estimate and extract the signal components in the order of magnitude during each iteration round.

In its preferred embodiment the estimation block comprises estimate post-processing means 26, where the obtained estimates are post-processed for example by filtering successive estimates with a sequential LMMSE filter, which is described in greater detail in the aforementioned reference Stephen M. Kay, or with other non-linear estimators, which can be implemented by means of a neural network.

Each estimation means 23, 24, 25 may also comprise logic elements, which select the desired signals to be extracted on the basis of the autocorrelation properties or the amplitudes and delays of the components.

Figure 3:
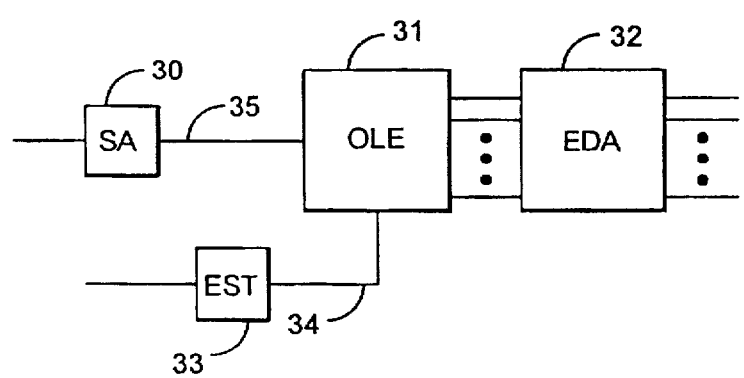
FIG. 3 is a block diagram illustrating another possible structure of a receiver according to the invention.

FIG. 3 is a block diagram illustrating another possible structure of a receiver according to the invention. The receiver comprises sampling means 30, which are used to sample the received signal at a high sample rate. The receiver further comprises channel estimation means 33, the input of which is the received signal, and which perform the channel estimation with the method according to the invention, as described above. The structure of the block 33 may be, for example, of the type shown in FIG. 2. The receiver also comprises a detector means 31, the input of which is the sampled signal 35 and the output signal 34 of the channel estimator, the latter signal comprising estimates of the amplitudes and delays of the signal components contained in the channel. The detector means 31 utilize an adjustable monitoring period, which extends over several symbols and which enables reliable estimates. The detector means 31 recursively calculate an estimate from the samples for each desired transmission, and whenever a new sample arrives, the means 31 update the calculated estimates on the basis of the new sample with a calculable correction coefficient. The receiver also comprises a post-processing means 26, where the symbol estimates can be further defined with a suitable detection method. This receiver arrangement is described in greater detail in the aforementioned co-pending Finnish Patent Application 944202, which is referred to here.

Even though the invention is described above with reference to the example according to the accompanying drawings, it is clear that the invention is not restricted thereto, but it can be modified in many ways within the inventive idea disclosed in the appended claims.

We claim:

1. A method for estimating a channel response in a receiver of a cellular radio system, a signal received in the receiver comprising transmissions of one or more users and being filtered with a filter matched with the waveform of the signal, characterized in that in a first iteration round, estimates of delays and amplitude of a strongest signal component of each user are obtained from the filtered signal, wherein the strongest estimated signal component of each user is extracted from the filtered signal to produce a first signal, and that estimates of delays and amplitude of a second strongest signal component of each user are obtained from the first signal, wherein the second strongest signal component of each user is extracted from the first signal to produce a remaining signal, and that always estimates of delays and amplitude of a next strongest signal component of each user are obtained from the remaining signal, wherein the next strongest signal component of each user is extracted from the remaining signal to produce a next remaining signal, until all signal components have been estimated and extracted from the next remaining signal, and that in a next iteration round, a combination of the signal components of each user, less the strongest signal component of each user, is extracted from the filtered signal to produce a revised signal, and that estimates of the delays and amplitude of the strongest signal component of each user are obtained from the revised signal, wherein the strongest signal component of each user is extracted from the revised signal to produce a remaining revised signal, and that always estimates of the delays and amplitude of the next strongest signal component of each user are obtained from the remaining revised signal, wherein the next strongest signal component of each user is extracted from the remaining revised signal to produce a next remaining revised signal, until all signal components have been estimated and extracted from the next remaining revised signal, and that a desired number of iteration rounds are performed.

2. A method according to claim 1, characterized in that iteration rounds are performed until a predetermined value for a channel estimation error has been reached.

3. A method according to claim 1, characterized in that when a decision concerning the extraction of a signal component from the received signal is made, the amplitude of the signal component and its location with respect to the other signal components are taken into account.

4. A method according to claim 1, characterized in that when a decision concerning the extraction of a signal component from the received signal is made, the cross-correlation properties of the spreading codes used are taken into account.

5. A method according to claim 1, characterized in that the estimation values provided by the iteration rounds are post-processed with linear or nonlinear methods.

6. A receiver receiving a signal which contains transmissions from one or more users and comprising means (20) for filtering the received signal with a filter matched with the waveform of the signal, characterized in that the receiver comprises means (23) for extracting a strongest signal component of each user from the filtered signal to produce a first signal, and means (20) for estimating delays and amplitudes of the strongest signal component of each user from the filtered signal, and that the receiver comprises means (23) for estimating delays and amplitude of a next strongest detected signal component of each user from the first signal, and extracting said next strongest detected signal component of each user from the first signal to produce a remaining signal, and means (23) for always estimating the delays and amplitude of the next strongest detected signal component of each user from the remaining signal and extracting from the remaining signal the next strongest detected signal component of each user, until all signal components have been estimated and extracted from the remaining signal, and that the receiver comprises means (24) for extracting a combination of the signal components of each user, less the strongest signal component of each user, from the filtered signal to produce a next signal, and means (24) for estimating again the delays and amplitude of the strongest signal component of each user from the next signal and extracting the strongest signal component of each user from the next signal to produce a remaining next signal, and means (24) for estimating the delays and amplitude of the next strongest signal component of each user from the remaining next signal and extracting from the remaining next signal always the next strongest signal component of each user, until all signal components have been estimated and extracted from the remaining next signal, and that the receiver comprises means (25) for performing a necessary number of estimation rounds on the received signal.

7. A receiver according to claim 6, characterized in that the receiver comprises means (26) for processing the estimated signal with linear or nonlinear methods.

8. A receiver according to claim 6, characterized in that the receiver comprises means (22) where the received signal is stored during the estimation process.

9. A method according to claim 2, wherein the channel estimation error is determined in accordance with the following formula:

$$E(a, D) = \sum_{i=0}^{N-1} \left| r(t_i) - \sum_{j=1}^{L} a_j s(t_i - d_j) \right|^2$$

wherein a=an amplitude of a signal component of interest; D=a delay of the signal component of interest; N=a predetermined number of measurements taken during a sampling period; L=a predetermined number of estimating and extracting iterations; r(t)=a signal received by the receiver; and s(t)=a signal being transmitted through the channel of the cellular radio system.

10. A method for estimating a channel response in a receiver of a code division multiple access (CDMA) cellular radio system, wherein a propagated signal received in the receiver is filtered with a filter matched with the waveform of the propagated signal, the method comprising the steps of:

in a first round, estimating delays and amplitude of one of a plurality of signal components comprising the filtered propagated signal, and extracting the estimated signal component from the filtered propagated signal according to at least one extraction criterion to produce a remaining signal;

wherein the delays and amplitude of each of the plurality of signal components are iteratively estimated and the estimated signal component is iteratively extracted from the remaining signal according to the at least one extraction criterion until each of the plurality of signal components has been estimated and extracted;

in a next round, a combination of the plurality of signal components of a previous round, less a signal component extracted according to the at least one extraction criterion, are extracted from the filtered propagated signal to produce a revised signal; and estimating the delays and amplitude of each one of the plurality of signal components from the revised signal, and extracting the estimated signal component according to the at least one extraction criterion to produce a remaining revised signal;

wherein the delays and amplitude of each of the plurality of signal components are iteratively estimated and the estimated signal component is iteratively extracted from the remaining revised signal according to the at least one extraction criterion until each of the plurality of signal components has been estimated and extracted.

11. A method according to claim 10, wherein the at least one extraction criterion selects a signal component with a highest local maximum output value of the matched filter.

12. A method according to claim 10, wherein the receiver is located in a base station of the CDMA cellular radio system, and the filtered propagated signal includes transmissions from several users such that the strongest propagated signal components of each user are estimated and extracted from the filtered propagated signal.

13. A method according to claim 10, wherein the receiver is located in a subscriber terminal of the CDMA cellular radio system, and the filtered propagated signal is a filtered multipath-propagated signal transmitted from a base station of the CDMA cellular radio system.

14. A method according to claim 10, wherein the received propagated signal is successively filtered and estimated such that the successive estimates of each of the plurality of signal components of the filtered propagated signal are combined into a calculated estimate for each signal component.

15. A method according to claim 14, wherein the successive filtering and estimating is performed during an adjustable monitoring period which extends over several symbols.

16. A method according to claim 10, wherein the at least one extraction criterion employs fuzzy logic in making decisions concerning an order of signal component extraction.

17. A method according to claim 10, wherein the at least one extraction criterion employs heuristic rules of decision-making concerning an order of signal component extraction.

18. A method according to claim 17, wherein the heuristic rules of decision-making include a consideration of properties of an autocorrelation function of spreading codes of the propagated signal.

* * * * *